(12) United States Patent
Nagurney et al.

(10) Patent No.: US 8,959,913 B2
(45) Date of Patent: Feb. 24, 2015

(54) SYSTEMS AND APPARATUS FOR TRANSFERRING FLUID FLOW

(75) Inventors: Jonathan Nagurney, Lawrence Park, PA (US); Daniel Loringer, Lawrence Park, PA (US); Kendall Swenson, Lawrence Park, PA (US); Lukas Johnson, Lawrence Park, PA (US); Rodrigo Rodriguez Erdmenger, Garching (DE); Amit Sharma, Bangalore (IN); Swaminathan Gopalakrishnan, Bangalore (IN)

(73) Assignee: General Electric Company, Schenectady, NY (US)

( * ) Notice: Subject to any disclaimer, the term of this patent is extended or adjusted under 35 U.S.C. 154(b) by 174 days.

(21) Appl. No.: 13/233,506

(22) Filed: Sep. 15, 2011

(65) Prior Publication Data

US 2013/0067917 A1 Mar. 21, 2013

(51) Int. Cl.
| | |
|---|---|
| *F02B 33/44* | (2006.01) |
| *F02D 23/00* | (2006.01) |
| *F02B 33/00* | (2006.01) |
| *F02B 37/013* | (2006.01) |
| *F01N 13/18* | (2010.01) |
| *F02B 37/00* | (2006.01) |

(Continued)

(52) U.S. Cl.
CPC .......... *F02B 37/013* (2013.01); *F01N 13/1816* (2013.01); *F02B 37/004* (2013.01); *F02B 37/02* (2013.01); *F02B 37/18* (2013.01); *F17D 1/04* (2013.01); *Y02T 10/144* (2013.01)
USPC ................ 60/612; 60/602; 60/605.1; 60/607; 60/611; 123/562; 123/559.1

(58) Field of Classification Search
USPC .......................... 60/602–612; 123/562, 559.1
See application file for complete search history.

(56) References Cited

U.S. PATENT DOCUMENTS

| | | | |
|---|---|---|---|
| 4,196,593 A | 4/1980 | Froeliger | |
| 4,678,397 A * | 7/1987 | Komatsu et al. | ............... 415/151 |

(Continued)

FOREIGN PATENT DOCUMENTS

| | | | |
|---|---|---|---|
| DE | 102007046667 A1 | 4/2009 | |
| EP | 1843019 A1 * | 10/2007 | ................ F01N 3/02 |

(Continued)

OTHER PUBLICATIONS

LHTEC T800-LHT-801, http://www.turbokart.com/about_t800.htm, 4 pgs., Sep. 7, 2011.

(Continued)

*Primary Examiner* — Thai Ba Trieu
*Assistant Examiner* — Deming Wan
(74) *Attorney, Agent, or Firm* — GE Global Patent Operation; John A. Kramer

(57) ABSTRACT

Various apparatuses and systems are provided for a turbocharger. In one example, the turbocharger system includes a first turbine having an exhaust flow outlet and a second turbine having an exhaust flow inlet. The turbocharger system further includes a transition conduit fluidically coupling the outlet of the first turbine to the inlet of the second turbine, the transition conduit including an expansion region upstream of a first bend, and a bypass which routes exhaust flow around the first turbine, the bypass having an exhaust flow outlet fluidically coupled to the transition conduit downstream of the expansion region.

20 Claims, 3 Drawing Sheets

(51) Int. Cl.
*F02B 37/02* (2006.01)
*F02B 37/18* (2006.01)
*F17D 1/04* (2006.01)

(56) References Cited

U.S. PATENT DOCUMENTS

| | | | | |
|---|---|---|---|---|
| 4,907,952 | A | * | 3/1990 | Inoue et al. .................. 417/407 |
| 5,119,633 | A | * | 6/1992 | Brooks et al. .................. 60/624 |
| 5,619,854 | A | * | 4/1997 | Ramsden et al. ............... 60/612 |
| 6,802,184 | B2 | * | 10/2004 | Huter et al. .................... 60/612 |
| 7,000,634 | B2 | * | 2/2006 | Lindborg .................. 137/625.3 |
| 7,305,827 | B2 | | 12/2007 | Arnold et al. |
| 7,779,633 | B2 | | 8/2010 | Roettger et al. |
| 7,877,981 | B2 | | 2/2011 | Newman |
| 8,307,650 | B2 | * | 11/2012 | Robinson et al. ............... 60/612 |
| 2006/0042246 | A1 | * | 3/2006 | Gray et al. ..................... 60/612 |
| 2009/0084364 | A1 | * | 4/2009 | Martins et al. ................ 123/563 |
| 2009/0211247 | A1 | | 8/2009 | McEwan et al. |
| 2009/0217662 | A1 | | 9/2009 | Giselmo et al. |
| 2009/0249786 | A1 | * | 10/2009 | Garrett et al. .................. 60/612 |
| 2010/0319343 | A1 | | 12/2010 | Arnold et al. |
| 2011/0020108 | A1 | | 1/2011 | Axelsson et al. |
| 2011/0123315 | A1 | | 5/2011 | Robinson |

FOREIGN PATENT DOCUMENTS

| | | |
|---|---|---|
| FR | 2945577 A1 | 11/2010 |
| MX | PA01007061 | 10/2004 |
| WO | 0181744 A1 | 11/2001 |
| WO | 2007061339 A1 | 5/2007 |
| WO | 2009118471 A1 | 10/2009 |
| WO | 2012016712 A1 | 2/2012 |

OTHER PUBLICATIONS

Search Report and Written Opinion from corresponding PCT Application No. PCT/US2012/053514 dated Jun. 12, 2013.

* cited by examiner

SYSTEMS AND APPARATUS FOR TRANSFERRING FLUID FLOW

FIELD

Embodiments of the subject matter disclosed herein relate to systems and apparatuses for transferring a fluid flow between parts of an engine system. Other embodiments relate to fluid flow within a turbocharger system.

BACKGROUND

Turbochargers may be used in combination with heat exchangers to deliver a higher air density and/or pressure to an engine system. In one example, the turbocharger includes a turbine positioned in an exhaust passage of the engine which at least partially drives a compressor to increase the intake air pressure. In some examples, the engine system may include two or more turbochargers to further increase the pressure of the intake air, such as a two-stage turbocharger which includes a high pressure turbocharger fluidically coupled to a low pressure turbocharger. In such an example, exhaust gas may be delivered from the high pressure turbine to the low pressure turbine. In some examples of such a configuration, the exhaust gas flow from the high pressure turbine may be turned up to 180 degrees due to available packaging space or a desired turbocharger arrangement, for example. Turning the exhaust flow in this manner may lead to losses in flow enthalpy, boundary layer separation, pressure losses, and/or non-uniform exhaust flow into the low pressure turbine.

BRIEF DESCRIPTION

In one embodiment, a turbocharger system includes a first turbine having an exhaust flow outlet and a second turbine having an exhaust flow inlet. The turbocharger system further includes a transition conduit fluidically coupling the outlet of the first turbine to the inlet of the second turbine, the transition conduit including an expansion region upstream of a first bend. The system may further include a bypass which routes exhaust flow around the first turbocharger, the bypass having an exhaust flow outlet fluidically coupled to the transition conduit downstream of the expansion region.

By including a transition conduit with an expansion region, the exhaust flow may be diffused upstream of a first bend. Further, by introducing exhaust gas which bypassed the first turbocharger downstream of the expansion region, the exhaust gas flow through the transition conduit may be restructured after the first bend. In this manner, a pressure drop around the first bend may be reduced such that flow enthalpy is conserved, and a more uniform exhaust gas flow may be delivered to the second turbine. As such, efficiency of the turbocharger system may be increased and specific fuel consumption may be reduced, thereby increasing a thermal efficiency of the engine.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of systems and apparatuses for an engine with a two-stage turbocharger. In one example embodiment, a turbocharger system includes a first turbine having an exhaust flow outlet and a second turbine having an exhaust flow inlet. The turbocharger system further includes a transition conduit fluidically coupling the outlet of the first turbine to the inlet of the second turbine, the transition conduit including an expansion region upstream of a first bend, and a bypass which routes exhaust flow around the first turbocharger. The bypass has an exhaust flow outlet fluidically coupled to the transition conduit downstream of the expansion region. In such a configuration, the expansion region diffuses the exhaust gas flow upstream of the first bend in the transition conduit and the bypass introduces exhaust gas flow downstream of the expansion region such that energy loss as the exhaust gas flow is turned through the first bend is reduced. Further, in some embodiments, the transition conduit further includes an inner-body positioned within the transition conduit, the inner-body shaped such that an exhaust gas flow cross-section is maintained as an outer diameter of the transition conduit expands at a second bend. By including the inner-body within the transition conduit, energy losses may be reduced as the exhaust gas flow turns through the second bend. In this manner, the exhaust gas flow may be turned by 180 degrees from the outlet of the first turbine to the inlet of the second turbine while flow enthalpy is maintained.

Figure 1:
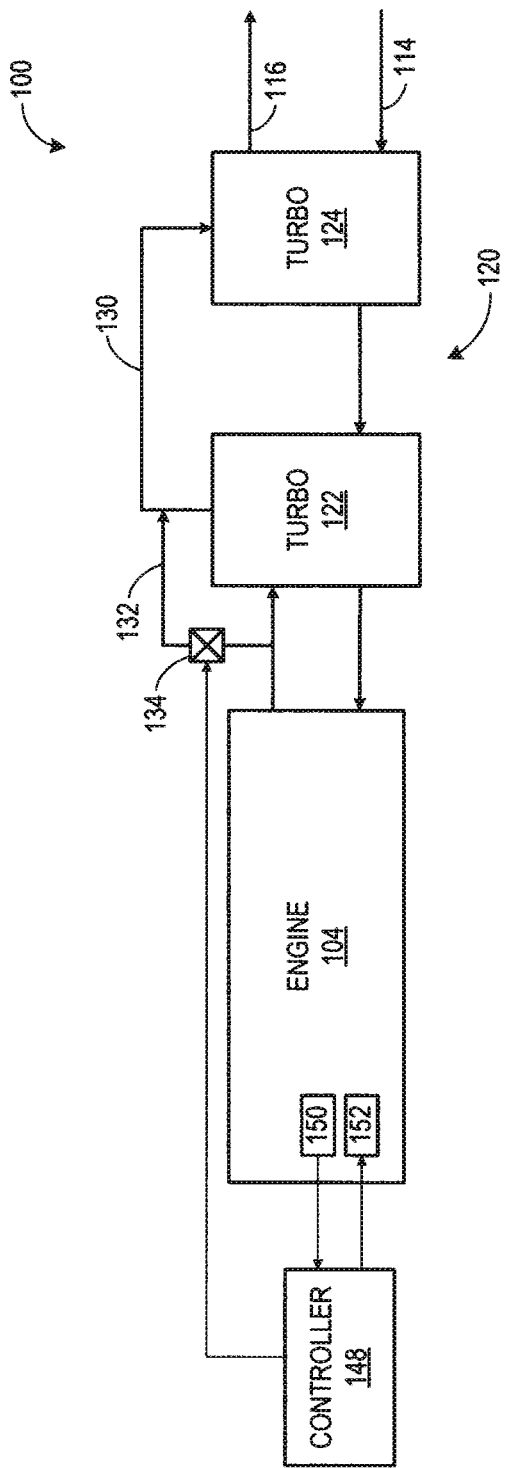
FIG. 1 shows an engine system including a two-stage turbocharger, according to an embodiment of the invention.

FIG. 1 depicts an exemplary embodiment of an engine system 100. As shown, the engine system 100 includes an engine 104, such as an internal combustion engine. The engine 104 may be a diesel engine that combusts air and diesel fuel through compression ignition. In other non-limiting embodiments, the engine 104 may combust fuel including gasoline, natural gas, hydrogen, kerosene, biodiesel, or other petroleum distillates of similar density through compression ignition (and/or spark ignition). The engine 104 may be included in a propulsion system, such as in a ship, or a rail vehicle or other off-highway vehicle; in other embodiments, the engine 104 may be a stationary engine, such as in a power-plant application.

The engine 104 receives intake air for combustion from an intake passage 114. The intake passage 114 may receive ambient air from an air filter (not shown) that filters the air. Exhaust gas resulting from combustion in the engine 104 is supplied to an exhaust, such as an exhaust passage 116.

The engine system 100 further includes a two-stage turbocharger 120 with a first turbocharger (TURBO) 122 and a second turbocharger 124. The first turbocharger 122 and the second turbocharger 124 are configured in series and arranged between the intake passage 114 and the exhaust passage 116. The first turbocharger 122 and second turbocharger 124 increase air charge of ambient air drawn into the intake passage 114 in order to provide greater charge density during combustion, to increase power output and/or engine-operating efficiency. In one example, the first turbocharger 122 is a relatively smaller, "high-pressure" turbocharger that performs work on air of a relatively higher input pressure. Further in this example, the second turbocharger 124 is a relatively larger, "low-pressure" turbocharger 124 that performs work on air of a relatively lower input pressure. The pressure ratio from the high-pressure turbocharger and the pressure ratio from the low-pressure turbocharger may be multiplied to provide an overall pressure ratio. When only a single turbocharger stage is employed, for example, efficiency may decrease as the single stage pressure ratio increases. When a two-stage turbocharger is employed, however, higher pressure ratios may be achieved more efficiently with the two smaller pressure ratio stages. Further, in some examples, a heat exchanger such as an intercooler may be disposed between the compressor stages, thereby increasing the air density and further increasing the efficiency of the compression process. As described in more detail below, and as shown in FIG. 1, an apparatus such as a transition conduit 130 is coupled between an outlet of the first turbocharger (not shown in FIG. 1) and an inlet (not shown in FIG. 1) of the second turbocharger 124 to deliver exhaust gas flow from the first turbocharger 122 to the second turbocharger 124. While in this case two turbochargers in series are included, the system may include additional turbine and/or compressor stages. Further, in other non-limiting embodiments, the first turbocharger 122 and second turbocharger 124 may have substantially equivalent compressor pressure ratios.

As depicted in FIG. 1, the engine system 100 includes a bypass 132 which routes exhaust gas flow around the first turbocharger 122 to the second turbocharger 124 as desired. The bypass 132 includes a bypass valve 134 (wastegate) or other flow control element. The bypass valve 134 may be an on/off valve controlled by a controller 148, or the controller 148 may control a variable amount of exhaust gas flow around the first turbocharger 122, for example. As described in greater detail below, an outlet of the bypass 132 is fluidically coupled to the transition conduit 130.

The controller 148 is part of the engine system 100, and is configured to control various components related to the engine system 100. In one example, the controller 148 includes a computer control system. The controller 148 further includes computer-readable storage media (not shown) including code for enabling on-board monitoring and control of engine system operation. The controller 148, while overseeing control and management of the engine system 100, may be configured to receive signals from a variety of engine sensors 150, in order to determine operating parameters and operating conditions, and correspondingly adjust various engine actuators 152 to control operation of the engine system 100. For example, the controller 148 may receive signals from various engine sensors including, but not limited to, engine speed, engine load, boost pressure, exhaust pressure, ambient pressure, exhaust temperature, etc. Correspondingly, the controller 148 may control the engine system 100 by sending commands to various components such as cylinder valves, a throttle, the turbocharger bypass valve 134, etc.

Various embodiments of the invention relate to apparatuses for transferring a fluid flow, e.g., the apparatus may be used as the transition conduit 130. In one example, an apparatus for transferring a fluid flow comprises a first conduit portion, a second conduit portion, and a third conduit portion. The first conduit portion includes a fluid inlet, and increases in cross-section along a direction of the fluid flow (e.g., the direction of fluid flow originates at the inlet and extends along the body of the apparatus). The second conduit portion includes a first bend which turns the fluid flow (e.g., a fluid flowing in the direction of fluid flow) so that it flows at an angle with respect to the direction of fluid flow in the first conduit portion. The third conduit portion includes a fluid outlet and a second bend which turns the fluid flow such that it flows parallel to and opposite to the direction of fluid flow in the first conduit portion. The apparatus further comprises an auxiliary flow inlet. The auxiliary flow inlet is positioned in the first bend of the second conduit portion such that an auxiliary flow entering the second conduit portion through the auxiliary flow inlet would flow perpendicular to the direction of fluid flow of the first conduit portion.

Figure 2:
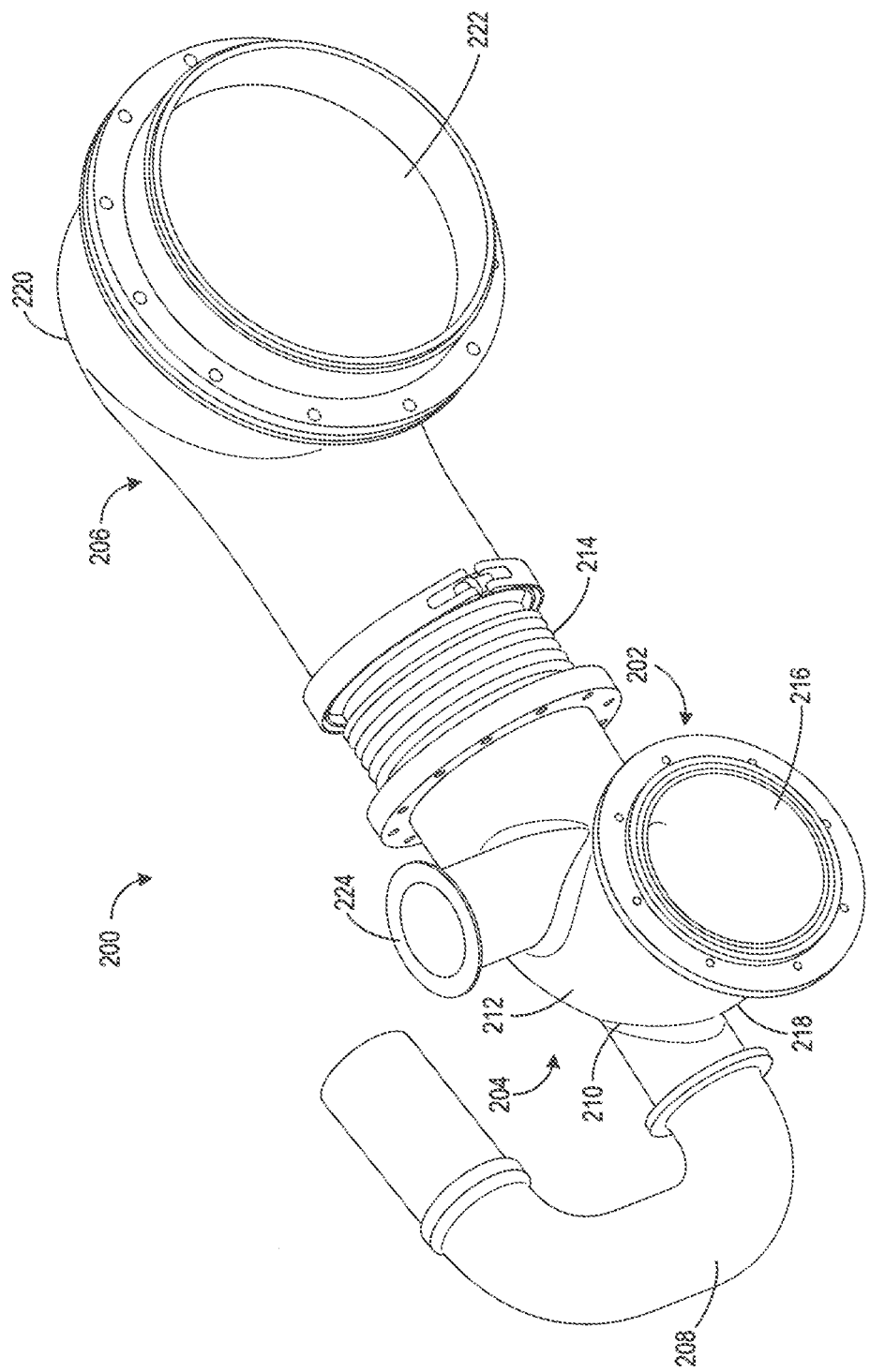
FIG. 2 shows a perspective view of an apparatus for transferring fluid flow, according to an embodiment of the invention.

FIG. 2 shows a perspective view of an exemplary embodiment of an apparatus 200 for transferring fluid flow, such as for use as the transition conduit 130 depicted in FIG. 1. In the examples described herein, the fluid is exhaust gas from an engine. In other examples, the fluid may be another suitable gas or liquid.

As depicted in FIG. 2, the apparatus 200 includes a first conduit portion 202, a second conduit portion 204, and a third conduit portion 206, where the second conduit portion 204 is positioned downstream of the first conduit portion 202 and the third conduit portion 206 is positioned downstream of the second conduit portion 204. The first, second, and third conduit portions are coupled (directly or indirectly) to one another, and together define an interior passage for the flow of exhaust gas or another fluid. For example, the first conduit may define a first part of the passage, the second conduit may define a second part of the passage (which is fluidly coupled to the first part of the passage), and the third conduit may define a third part of the passage (which is fluidly coupled to the second part of the passage).

The first conduit portion 202 includes a fluid inlet 216 through which fluid enters the apparatus 200 and an expansion region 218 which increases in diameter along the direction of fluid flow. (The direction of fluid flow starts at the fluid inlet 216, extends through the first conduit portion, then the second conduit portion, and then through the third conduit portion.) As the fluid flows through the first conduit portion 202, the fluid is diffused in the expansion region 218 such that the fluid flow slows down before turning and flow separation is reduced. The expansion region 218 is described in greater detail below with reference to FIG. 3.

The second conduit portion 204 includes a first bend 212 and an auxiliary flow inlet 210. The first bend 212 turns the fluid flow by an angle of between 1 and 179 degrees, for example. (In the example embodiment shown in FIG. 2, the first bend 212 turns the fluid flow approximately 90 degrees.) As depicted, the first bend 212 is the first bend downstream from the fluid inlet 216. A conduit 208 through which an auxiliary flow passes is shown coupled to the second conduit portion 204 of the apparatus 200. In one example, the auxiliary flow may be an exhaust gas flow that has bypassed a first turbine of a first turbocharger, as described above with reference to FIG. 1 and below with reference to FIG. 3. As depicted, an auxiliary flow inlet 210 is positioned in the first bend 212 of the apparatus 200 such that the auxiliary flow enters the second conduit portion 204 perpendicular to the direction of fluid flow of the first conduit portion 202. In such a configuration, the auxiliary flow may facilitate restructuring of flow that has separated while turning through the first bend 212, for example. Further, the auxiliary flow may impart a swirl in the flow which improves flow conditions downstream.

The third conduit portion 206 includes a second bend 220 and a fluid outlet 222. The second bend may turn the fluid flow by an angle of between 1 and 179 degrees. In the example embodiment shown in FIG. 2, the second bend 220 turns the fluid flow approximately 90 degrees. Together, the first bend 212 and the second bend 220 may turn the flow by 180 degrees such that the flow exits the apparatus 200 through the fluid outlet 222 parallel to and in the opposite direction of the fluid flow that enters the fluid inlet 216. In some embodiments, the third conduit portion 206 may include an inner-body, as will be described in greater detail below with reference to FIG. 3. The inner-body may be disposed within the third conduit portion 206 of the apparatus 200 such that a flow cross-sectional area of the apparatus 200 is maintained if a diameter of the apparatus 200 increases as the flow is turned through the second bend 200. In this manner, energy losses due to turning the flow with the second bend 206 may be reduced.

In some embodiments, such as depicted in FIG. 2, a bellows 214 is coupled between the second conduit portion 204 and third conduit portion 206. The bellows 214 may compensate for thermal expansion, for example. In other embodiments, the apparatus may not include a bellows or the apparatus may include more than one bellows, as desired.

In some embodiments, such as in the exemplary apparatus 200 shown in FIG. 2, the apparatus further includes a second auxiliary flow inlet 224. In one example, the second auxiliary flow may be an engine cylinder bypass flow. In such an example, by using the engine cylinder bypass, a turbocharger compressor may operate at a more efficient point while maintaining engine demands. Further, the engine cylinder bypass may be utilized when turbocharger surge avoidance is desired during engine speed transients.

Thus, the apparatus may transfer a fluid flow such that the fluid flow is turned by 180 degrees while reducing energy losses from turning the flow. Such an apparatus may be fluidically coupled between an outlet of a high-pressure turbocharger and an inlet of a low-pressure turbocharger, for example, as described below with reference to FIG. 3.

Figure 3:
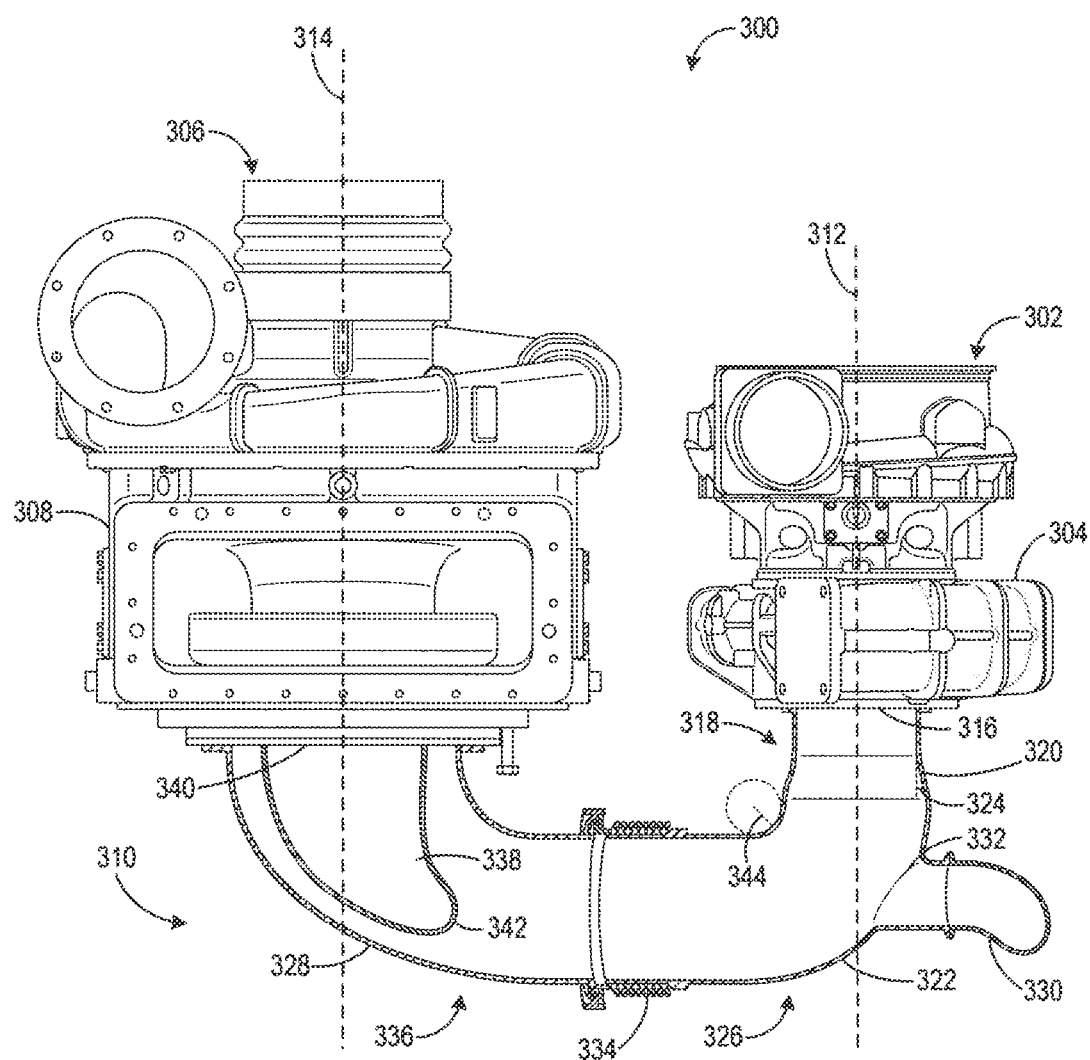
FIG. 3 shows a cross-sectional view of a transition conduit fluidically coupled between two turbochargers, according to an embodiment of the invention.

Turning to FIG. 3, a turbocharger system 300, such as the two-stage turbocharger 120 described above with reference to FIG. 1, is shown. The turbocharger system 300 includes a first turbocharger 302 and a second turbocharger 306 fluidically coupled by a transition conduit 310, such as the apparatus 200 for transferring a fluid flow described above with reference to FIG. 2. A top-down view of the first and second turbochargers 302 and 306 is shown in FIG. 3, while a cross-sectional view of the transition conduit 310 is shown.

The first turbocharger 302 includes a first turbine 304 and the second turbocharger 306 includes a second turbine 308. In some embodiments, the first turbine 304 and the second turbine 308 may be substantially similar. In other embodiments, the first turbine 304 and the second turbine 308 may be different. For example, the first turbocharger 302 with the first turbine 304 may be a high-pressure turbocharger with a high-pressure turbine, and the second turbocharger 306 with the second turbine 308 may be a low-pressure turbocharger with a low-pressure turbine. The first and second turbochargers 302 and 306 may be designed to provide desired pressure ratios for a particular engine system, for example. As shown, in an embodiment, a rotational axis 312 of the first turbine 304 is aligned in parallel with a rotational axis 314 of the second turbine 308. As used herein, "rotational axis" describes an axis about which blades of the turbine rotate. As depicted in FIG. 3, the first turbocharger 302 and the second turbocharger 306 are positioned right next to one another. In such a configuration, the transition conduit 310 between the first turbine 304 and the second turbine 308 may be relatively short, thereby reducing an amount of packing space needed for the turbocharger system.

Exhaust gas flows from the first turbine 304 to a first conduit portion 318 through an outlet 316 of the first turbine 304 in a first direction of fluid flow. As depicted, the outlet 316 of the first turbine 304 is centered about the rotational axis 312 of the first turbine 304. The first conduit portion 318 includes an expansion region 320 which increases in cross-section along the first direction of fluid flow from the first turbine 304. For example, a diameter of the transition conduit 310 (e.g., a diameter of the interior passage defined by the conduit portion 318) increases along the direction of fluid flow in the expansion region 320 resulting in an increasing cross-sectional area of the transition conduit 310 along the direction of fluid flow in the expansion region 320. In this manner, the exhaust gas flow may be diffused and slowed down upstream of a bend 322 in the transition conduit 310. In some examples, such as the embodiment depicted in FIG. 3, the expansion region has a conical divergence angle 324 of between 10 and 15 degrees. In other examples, the expansion region may have a conical divergence angle of less than 10 degrees or more than 15 degrees depending on the geometry of the configuration.

Once the exhaust gas flow is diffused in the expansion region 320, the exhaust gas flows to the first bend 322 in a second conduit portion 326 of the transition conduit 310. As depicted in FIG. 3, the first bend 322 is the first bend in the transition conduit 310 downstream from the outlet 316 of the first turbine 304 and the first bend upstream of the inlet 340 of the second turbine 308. For example, there are no other bends upstream of the first bend 322. The first bend 322 turns the exhaust gas flow so that it flows at an angle with respect to the first direction of exhaust gas flow in the first conduit portion 318. In the embodiment shown in FIG. 3, the first bend 322 turns the exhaust gas flow by an angle of approximately 90 degrees. In other embodiments, the first bend 322 may turn the exhaust gas flow by an angle of between 1 and 179 degrees such that, together with a second bend 328 positioned downstream of the first bend 322, the exhaust gas flow is turned a total of 180 degrees before it enters the second turbine 308. In some embodiments, the first bend 322 has a bend radius 344 of between 165 mm and 200 mm. The bend radius 344 may depend on how much the expansion region 320 diffuses the exhaust gas flow upstream of the first bend 322. For example, the more diffuse the flow, the tighter the bend radius. Thus, in other examples, the bend radius may be greater than 200 mm or less than 165 mm, depending on the flow diffusion of the expansion region.

While passing through the first bend 322, the exhaust gas flow may separate as the velocity of the flow becomes non-uniform. Thus, a bypass 330 which routes exhaust gas flow around the first turbine 304 is configured such that an outlet 332 of the bypass 330 is fluidically coupled to the transition conduit 310 downstream of the expansion region 320 in the first bend 322. As depicted in FIG. 3, exhaust gas enters the second conduit portion 326 in the first bend 322 such that the exhaust gas flow is perpendicular to the direction of flow in the expansion region 320. The exhaust gas flow which has bypassed the first turbine 304 may have a greater temperature and/or pressure than the exhaust gas flow which passed through the first turbine 304. In such a configuration, the exhaust gas flow directed into the transition conduit 310 from the bypass 330 may assist in restructuring of the exhaust gas flow within the transition conduit 310 downstream of the first bend 322, thereby reducing energy losses. Further, the exhaust gas flow from the bypass 330 may impart a swirl in the exhaust gas flow through the transition conduit 310 which may improve flow conditions downstream. The position of the bypass outlet 332 within the first bend may vary based on the geometry of the transition conduit, for example.

In some embodiments, such as shown in FIG. 3, the transition further includes a bellows 334 coupled between the second conduit portion 326 and a third conduit portion 336. The bellows 334 may compensate for thermal expansion in the transition conduit 310, for example.

Once the exhaust gas flow which includes exhaust gas that has passed through the first turbine 304 and/or the bypass 330 flows through the bellows 334, the exhaust gas flow approaches the second bend 328 in the transition conduit 310. In the embodiment shown in FIG. 3, the second bend 328 turns the exhaust gas flow by an angle of approximately 90 degrees. In other embodiments, the second bend 328 may turn the exhaust gas flow by an angle of between 1 and 179 degrees such that, together with the first bend 322 positioned upstream of the second bend 328, the exhaust gas flow is turned a total of 180 degrees before it enters the second turbine 308.

As depicted in FIG. 3, a cross-section of the second bend 328 increases along a direction of exhaust gas flow. For example, a diameter, and thus a cross-sectional area, of the transition conduit 310 increases along the direction of exhaust gas flow through the second bend 328. As an example, the diameter of the transition conduit 310 may increase such that a cross-section of the outlet of the transition conduit matches the cross-section of the inlet of the second turbine. In order to reduce diffusion and separation of flow through the second bend 328, in an embodiment, an inner-body 338 is disposed within the transition conduit 310. The inner-body 338 may be a solid body or a hollow body which is, for example, bolted to the turbocharger 306 such that the inner-body 338 is suspended within the transition conduit 310. The inner-body 338 may be shaped to maintain a flow cross-section of the transition conduit. For example, a diameter of the inner-body 338 may increase along the direction of exhaust gas flow in the third conduit portion 336 such that as the diameter of the transition conduit 310 increases, a cross-sectional area through which the exhaust gas may flow does not increase. In the example of FIG. 3, the inner-body 338 extends into the transition conduit 310 such that a first end 342 of the inner-body 338 is positioned within the second bend 328. In other embodiments, the inner-body may be longer or shorter, for example, depending on the geometry of the transition conduit 310. By including an inner-body within the third conduit portion where a cross-section of the transition conduit is increasing, separation of the exhaust gas flow through the second bend 328 may be reduced and flow enthalpy may be maintained.

The second bend 328 turns the exhaust gas flow such that it flows parallel to, but in the opposite direction of, the direction of exhaust gas flow in the expansion region 320 of first conduit portion 318. As such, the transition conduit 310 turns the exhaust gas flow approximately 180 degrees from the outlet 316 of the first turbine 304 to an inlet 340 of the second turbine 308. As shown in FIG. 3, the inlet 340 of the second turbine 308 is centered about the rotational axis 314 of the second turbine 308, which is parallel to the rotational axis 312 of the first turbine 304.

In the example embodiment depicted in FIG. 3, there are no intermediate devices (e.g., intercoolers or the like) positioned between the outlet 316 of the first turbine 304 and the inlet 340 of the second turbine 308. Further, the transition conduit 310 is a 180 degree turn. For example, the first flow direction transitions 90 degrees to a second flow direction only which transitions 90 degrees to a third direction only. In other words, in the transition conduit 310, there are no other turns but for the first bend 322 and the second bend 328. In the manner, an exhaust gas flow may be transferred from the first turbine 304 to the second turbine 308 efficiently in a relatively compact space.

Thus, the transition conduit as described above fluidically couples the outlet of the first turbine to the inlet of the second turbine. The transition conduit turns the exhaust gas flow from the first turbine by 180 degrees through a first bend and a second bend before it reaches the second turbine. By diffusing the exhaust gas flow via the expansion region and introducing exhaust gas flow which has bypassed the first turbine downstream of the expansion region, energy losses through the first bend in the transition conduit may be reduced. Further, by including the inner-body within the transition conduit, energy losses in the exhaust gas flow may be reduced through the second bend in the transition conduit. In this way, flow enthalpy in the transition conduit may be maintained such that a pressure drop in the transition conduit is reduced and exhaust gas flow with a uniform velocity profile is delivered to the second turbine. As such, efficiency of the second turbocharger may be increased, thereby reducing specific fuel consumption such that thermal efficiency of the engine is increased.

Another embodiment relates to an apparatus for transferring a fluid flow. The apparatus includes a first conduit portion having a fluid inlet, a second conduit portion, and a third conduit portion having a fluid outlet. The first, second, and third conduit portions are coupled to one another (directly or indirectly), and together define a fluid flow passage and a direction of fluid flow that extends from the fluid inlet, through the first conduit portion, then through the second conduit portion, and then through the third conduit portion to the fluid outlet. (For example, a fluid urged through the fluid inlet in the direction of fluid flow would travel through the fluid flow passage, along the first conduit portion, then along the second conduit portion, then along the third conduit portion for exiting the apparatus through the fluid outlet.) In the first conduit portion, along at least part of a length of the first conduit portion, the fluid flow passage increases in cross-section in the direction of fluid flow. (For example, if the first conduit portion has a length, then at a first point the flow passage has a maximum dimension "A", and at a second point the flow passage has a maximum dimension "B", B greater than A (B>A), and where the second point is further along the length than the first point in the direction of fluid flow.) The second conduit portion includes a first bend which turns the direction of fluid flow in the second conduit portion at an angle with respect to the direction of fluid flow in the first conduit portion. The third conduit portion includes a second bend which turns the direction of fluid flow in the third conduit portion parallel to and opposite to the direction of fluid flow in the first conduit portion, e.g., a fluid traveling through the first conduit portion in a first direction, then through the second conduit portion, and then through the third conduit portion, would be turned by the third conduit portion in a direction parallel and opposition to the first direction. The second conduit portion includes an auxiliary flow inlet. The auxiliary flow inlet is positioned in the first bend and configured for discharging an auxiliary flow perpendicular to the direction of fluid flow of the first conduit portion. For example, an auxiliary flow that enters the second conduit portion through the auxiliary flow inlet would flow perpendicular to the direction of fluid flow of the first conduit portion.

In another embodiment of the apparatus for transferring a fluid flow, the apparatus comprises a first conduit portion including a fluid inlet, a second conduit portion coupled with the first conduit portion, and a third conduit portion including a fluid outlet and coupled with the second conduit portion. Along a direction of fluid flow that extends from the fluid inlet, through the first conduit portion, then the second conduit portion, and then the third conduit portion to the fluid outlet, the first conduit portion increases in cross-section along at least part of its length. The second conduit portion includes a first bend which turns the direction of fluid flow of the second conduit portion at an angle with respect to the direction of the fluid flow of the first conduit portion. The third conduit portion includes a second bend which turns the direction of fluid flow of the third conduit portion parallel to and opposite to the direction of fluid flow of the first conduit portion. The apparatus further comprises an auxiliary flow inlet positioned in the first bend such that an auxiliary flow that enters the second conduit portion through the auxiliary flow inlet flows perpendicular (at least initially) to the direction of fluid flow of the first conduit portion.

In another embodiment of the apparatus for transferring a fluid flow, the apparatus comprises a first conduit portion including a fluid inlet and defining a first fluid flow passage. Along at least part of a length of the first fluid flow passage, the first fluid flow passage increases in cross-section in a direction of fluid flow that extends from the fluid inlet and along the first fluid flow passage. The apparatus further comprises a second conduit portion defining a second fluid flow passage fluidly coupled with the first fluid flow passage. The second conduit portion includes a first bend such that a fluid flowing through the second conduit portion from the first conduit portion to the third conduit portion is at an angle with respect to the direction of fluid flow of the first fluid flow passage. The second conduit portion includes an auxiliary flow inlet positioned in the first bend and configured such that an auxiliary flow entering the second fluid flow passage through the auxiliary flow inlet is perpendicular (at least initially) to the direction of fluid flow of the first fluid flow passage. The apparatus also comprises a third conduit portion defining a third fluid flow passage fluidly coupled to the second fluid flow passage and including a fluid outlet. The third conduit portion includes a second bend such that a fluid flowing through the third conduit portion from the second conduit portion to the fluid outlet is turned parallel and opposite to the direction of fluid flow of the first conduit portion.

Another embodiment relates to a turbocharger system for an engine. The turbocharger system includes a first turbocharger and a second turbocharger. The first turbocharger is a high-pressure turbocharger, and the second turbocharger is a low-pressure turbocharger. The first turbocharger has a first, high-pressure turbine, and the second turbocharger has a second, low-pressure turbine. The first turbine is fluidly coupled to an engine exhaust outlet; the first turbine is downstream of the exhaust outlet. The second turbine is positioned downstream of the first turbine; thus, the first turbine is upstream of the second turbine and the engine exhaust outlet is upstream of the first and second turbines. An outlet of the first turbine is fluidly coupled to an inlet of the second turbine, such that exhaust passing from the engine exhaust outlet and through the first turbine is routed to the second turbine. For fluid coupling, the turbocharger system includes an apparatus for transferring fluid (e.g., exhaust gas) between the first and second turbines. The apparatus includes a first conduit portion having a first conduit body (e.g., a metal body) that defines a first passage and a fluid inlet into the first passage. The fluid inlet is coupled to the outlet of the first turbine, such that the first passage and the outlet of the first turbine are fluidly coupled by way of the fluid inlet. Thus, exhaust gas exiting the outlet of the first turbine passes through the fluid inlet of the first conduit portion and into and through the first passage. The first passage includes an expansion region, wherein the first passage widens outwards as it transitions from the fluid inlet and along the direction that exhaust gas would flow when traveling from the first turbine to the second turbine. Thus, the first passage has a first lateral area (area perpendicular to the axis of flow direction in the first passage) at the start of the expansion region, and a second, greater lateral area at the end of the expansion region. For example, the expansion region may comprise the portion of the body of the first conduit portion that defines the expansion region of the flow passage being conical in shape.

The apparatus also includes a second conduit portion coupled with the first conduit portion. (The coupling may be direct or indirect, the latter referring to the two being coupled through an intermediate part or parts.) The second conduit portion has a second conduit body (e.g., a metal body) that defines a second passage; the second passage is fluidly coupled with the first passage of the first conduit body, downstream of the expansion region. The second conduit portion includes a first bend in the second passage, such that part of a length of a center line of the second passage is positioned at an angle (1-179 degrees, e.g., 90 degrees) with respect to a center line (and direction of exhaust flow) of the first passage of the first conduit portion. Thus, in operation with exhaust gas flowing from the first turbine, through the first conduit portion in a first direction, and then through the second conduit portion, the second conduit portion turns the exhaust flow at an angle (e.g., 90 degrees) with respect to the first direction.

The apparatus also includes a third conduit portion directly or indirectly coupled with the second conduit portion, downstream of the first bend. The third conduit portion has a third conduit body (e.g., a metal body) that defines a third passage and a fluid outlet; the third passage is fluidly coupled with the second passage and thereby the first passage. The third conduit portion is coupled to an inlet of the second turbine of the second turbocharger in alignment with the fluid outlet of the third conduit portion; thus, there is a fluid flow path from the third passage, through the fluid outlet, through the fluid inlet of the second turbine, and into the second turbine. The third conduit portion includes a second bend in the third passage, such that part of a length of a center line of the third passage is positioned at an angle (1-179 degrees, e.g., 90 degrees) with respect to the center line of the second passage. Thus, in operation with exhaust gas flowing through the second conduit portion and then through the third conduit portion, the exhaust gas is turned in the third passage at an angle with respect to the direction it flows through the second passage.

In an embodiment, a rotational axis of the first turbine is parallel to a rotational axis of the second turbine, and the outlet of the first turbine faces the same direction as the inlet of the second turbine. In operation, the first and second bends cause the exhaust flow exiting the first turbine to turn 180 degrees and in an opposite direction for entry into the second turbine.

In another embodiment, the apparatus for transferring fluid also includes an auxiliary flow inlet attached to the second conduit portion and positioned in the first bend. The auxiliary flow inlet defines a fluid flow path between the second passage and an exterior of the second conduit portion. The auxiliary flow inlet may be coupled to a bypass path of the first turbine. In operation, an auxiliary flow passing through the bypass path enters the second passage through the auxiliary flow inlet. The auxiliary flow inlet is configured (e.g., dimensioned and oriented) such that the auxiliary flow passing into the second passage through the auxiliary flow inlet flows perpendicular to the direction of fluid (e.g., exhaust) flow through the first conduit portion.

Thus, in operation, in an embodiment, exhaust gas exits the first turbine and passes through the first conduit portion in a first direction. The exhaust gas expands in the expansion region of the first conduit portion. The exhaust gas enters the second conduit portion, and is turned, e.g., by 90 degrees. Meanwhile, an auxiliary flow (e.g., exhaust gas bypassed around the first turbine) passes into the second conduit through the auxiliary flow inlet at a second direction, which may be perpendicular to the first direction. The auxiliary flow mixes with the exhaust gas from the first turbine. The combined flow enters the third conduit portion, where it is turned, e.g., by 90 degrees (in a direction parallel and opposite to the first direction), and passes through the fluid outlet of the third conduit portion and into the inlet of the second turbine of the second turbocharger.

In an embodiment, the diameter of the third passage of the third conduit portion increases as the third conduit transitions from the second conduit portion to the inlet of the second turbine. In another embodiment, the system further includes an inner body disposed in the third passage. Flow is diverted around the inner body, and the inner body is dimensioned such that a flow area of the third passage remains constant along a length of the second passage where the diameter increases.

As used herein, a value referred to as "between" two numerical end points includes the two end points and the range in between the end points.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A turbocharger system, comprising:
a first turbine having a first connecting region at an exhaust flow outlet, the exhaust flow outlet positioned to direct exhaust flow in a first direction;
a second turbine having a second connecting region at an exhaust flow inlet, the exhaust flow inlet positioned to intake exhaust flow in a second direction, opposite the first direction; and
a transition conduit having a first end connected to the first connecting region of the first turbine and a second end connected to the second connecting region of the second turbine to fluidically couple the exhaust flow outlet of the first turbine to the exhaust flow inlet of the second turbine, the transition conduit including a first bend downstream of the exhaust flow outlet of the first turbine and an expansion region upstream of the first bend, the expansion region comprising a region of the transition conduit that increases in cross-sectional area with a conical divergence angle of between 10 and 15 degrees along a direction of exhaust flow from the first end of the transition conduit and prior to the first bend, the transition conduit connected to the exhaust flow outlet of the first turbine at the first end.

2. The turbocharger system of claim 1, wherein the transition conduit includes a region upstream of the first bend, the region centered over a rotational axis of the first turbine and extending between the first end of the transition conduit and a beginning of the first bend.

3. The turbocharger system of claim 2, further comprising a bypass which routes exhaust flow around the first turbine, the bypass having an exhaust flow outlet fluidically coupled to the transition conduit downstream of the expansion region.

4. The turbocharger system of claim 3, wherein the exhaust flow outlet of the bypass directs exhaust flow into the transition conduit perpendicular to the direction of exhaust flow exiting the exhaust flow outlet of the first turbine.

5. The turbocharger system of claim 2, wherein the first turbine includes a rotational axis parallel to a rotational axis of the second turbine.

6. The turbocharger system of claim 2, wherein the turbocharger system is a two-stage turbocharger system, and the first turbine is a high-pressure turbine and the second turbine is a low-pressure turbine.

7. The turbocharger system of claim 2, wherein the first turbine includes a rotational axis parallel to the rotational axis of the second turbine, the turbocharger system is a two-stage turbocharger system, and the first bend has a bend radius of between 165 mm and 200 mm.

8. The turbocharger system of claim 2, wherein the transition conduit includes a second bend downstream of the first bend, the first bend and the second bend turning an exhaust flow a total of 180 degrees, the second bend upstream of the exhaust flow inlet of the second turbine.

9. The turbocharger system of claim 8, wherein the transition conduit includes a bellows disposed downstream of the first bend and upstream of the second bend.

10. The turbocharger system of claim 8, wherein the transition conduit further includes an inner-body disposed within the transition conduit, the inner-body shaped such that a flow cross-section of the transition conduit is maintained while a diameter of the transition conduit increases at the second bend.

11. The turbocharger system of claim 8, wherein the transition conduit includes a first piece connected to a second piece, the first piece including the first end and the first bend, the second piece including the second end and the second bend.

12. The turbocharger system of claim 1, wherein the transition conduit is u-shaped.

13. An apparatus for transferring a fluid flow, comprising:
a first conduit portion including a fluid inlet and defining a first fluid flow passage, wherein along at least part of a length of the first fluid flow passage, the first fluid flow passage increases in cross-sectional area with a conical divergence angle of between 10 and 15 degrees in a direction of fluid flow that extends from the fluid inlet and along the first fluid flow passage, the first conduit portion including a first connecting region configured to connect to an outlet of a first turbine of a first turbocharger;

a second conduit portion defining a second fluid flow passage fluidly coupled with the first fluid flow passage, wherein the second conduit portion includes a first bend such that a fluid flowing through the second conduit portion from the first conduit portion is at an angle with respect to the direction of fluid flow of the first fluid flow passage, and wherein the second conduit portion includes an auxiliary flow inlet positioned in the first bend and configured such that an auxiliary flow entering the second fluid flow passage through the auxiliary flow inlet is at least initially perpendicular to the direction of fluid flow of the first fluid flow passage; and a third conduit portion defining a third fluid flow passage fluidly coupled to the second fluid flow passage and including a fluid outlet, wherein the third conduit portion includes a second bend such that a fluid flowing through the third conduit portion from the second conduit portion to the fluid outlet is turned parallel and opposite to the direction of fluid flow of the first fluid flow passage, the third conduit portion including a connecting region configured to connect to an inlet of a second turbine of a second turbocharger.

14. The apparatus of claim 13, further comprising a bellows coupled between the second conduit portion and the third conduit portion.

15. The apparatus of claim 13, wherein the second conduit portion is positioned downstream of the first conduit portion and the third conduit portion is positioned downstream of the second conduit portion.

16. The apparatus of claim 13, further comprising an inner-body positioned within the third conduit portion and shaped such that a flow cross-section of the third conduit portion is maintained while a diameter of the third conduit portion increases.

17. An engine system, comprising:
a high-pressure turbine of a high-pressure turbocharger positioned in an exhaust passage of an engine and having a first connecting region;
a low-pressure turbine of a low-pressure turbocharger, wherein a rotational axis of the low-pressure turbine is parallel to a rotational axis of the high-pressure turbine, and wherein the low-pressure turbine is positioned downstream of the high-pressure turbine in the exhaust passage, the low-pressure turbine having a second connecting region; and
a transition conduit having a first end connected to the first connecting region and a second end connected to the second connecting region to fluidically couple an outlet of the high-pressure turbine to an inlet of the low-pressure turbine, the transition conduit comprising:
a first bend downstream of the outlet of the high-pressure turbine;
an expansion region downstream of the outlet of the high-pressure turbine and upstream of the first bend, the expansion region having a cross-sectional area that increases with a conical divergence angle of between 10 and 15 degrees along a direction of exhaust flow exiting the outlet of the high-pressure turbine;
a high-pressure turbine bypass with a bypass outlet positioned downstream of the expansion region;
a second bend positioned downstream of the expansion region and upstream of the inlet of the low-pressure turbine; and
an inner-body fixed to the low-pressure turbocharger and positioned within the transition conduit, the inner-body shaped to maintain a flow cross-section downstream around the second bend as an outer diameter of the transition conduit expands.

18. The engine system of claim 17, wherein the bypass outlet of the high-pressure turbine bypass is positioned in the first bend to direct exhaust flow into the transition conduit perpendicular to the direction of exhaust flow exiting the outlet of the high-pressure turbine.

19. The engine system of claim 17, wherein the transition conduit turns an exhaust flow from the engine 180 degrees from the outlet of the high-pressure turbine to the inlet of the low-pressure turbine.

20. The engine system of claim 17, wherein the second bend is positioned downstream of the first bend.

* * * * *